United States Patent [19]

Apple et al.

[11] 4,294,543
[45] Oct. 13, 1981

[54] OPTICAL SYSTEM FOR DEVELOPING POINT COORDINATE INFORMATION

[75] Inventors: Joseph Apple, Canoga Park, Calif.; Eric L. Upton, Mesa, Ariz.

[73] Assignee: Command Control & Communications Corporation, Lomita, Calif.

[21] Appl. No.: 93,524

[22] Filed: Nov. 13, 1979

[51] Int. Cl.³ ............................................. G08C 21/00
[52] U.S. Cl. ..................................... 356/375; 178/18
[58] Field of Search .................. 356/1, 141, 375, 376, 356/386, 387; 250/221, 222 R, 563; 324/178; 178/18

[56] References Cited

U.S. PATENT DOCUMENTS

| | | | |
|---|---|---|---|
| 3,184,847 | 5/1965 | Rosen | 356/375 |
| 3,401,937 | 9/1968 | Rockwood et al. | 250/222 R |
| 3,553,680 | 1/1971 | Cooreman | 178/18 |
| 3,613,066 | 10/1971 | Cooreman | 178/18 |
| 3,619,630 | 11/1971 | McLeod | 250/222 R |
| 3,804,535 | 4/1974 | Rodriguez | 356/434 |
| 3,805,064 | 4/1974 | Kornylak | 250/221 |
| 3,898,445 | 8/1975 | MacLeod | 356/141 |
| 3,905,705 | 9/1975 | Petrohilos | 356/387 |

*Primary Examiner*—R. A. Rosenberger
*Attorney, Agent, or Firm*—Freilich, Hornbaker, Wasserman, Rosen & Fernandez

[57] ABSTRACT

A method and apparatus for defining coordinates of an object intersecting a predefined plane. More particularly, the invention provides a means for generating first and second light beams and a means for sweeping the first and second light beams across the predefined plane. A continuous optical sensor, which could be a plurality of solar cells, is provided around a portion of the periphery of the predefined plane so that each light beam when swept across the plane intersects a portion of the optical sensor. Each light beam is swept across the plane by a rotating reflective surface. The reflective surfaces are rotated by respective motors which have control systems configured so that both light beams cannot simultaneously irradiate the optical sensor. A means for generating timing pulses when each light beam defines a predetermined reference angle is provided. The invention discloses a means whereby the interruption of each of the swept light beams by the intersecting object generates an interruption pulse which, in conjunction with its associated timing pulse, is used to define the angle of the light beam at the time of intersection with respect to its predetermined reference. The coordinates of the intersecting object can then be determined from the two angles. In the exemplary embodiment, the predefined plane is substantially coincident with a video monitor display surface, and the coordinate information is utilized to generate a visually identifiable cursor which appears on the video monitor.

15 Claims, 10 Drawing Figures

OPTICAL SYSTEM FOR DEVELOPING POINT COORDINATE INFORMATION

BACKGROUND OF THE INVENTION

The invention relates to position encoder apparatus, and more particularly, to an apparatus for generating coordinate information of an object intersecting a predefined plane.

Coordinate definition devices utilizing light beams to identify the coordinates of an object intersected by the light beams are many and varied. In one such device, a special pointer is provided whereby a light beam intersecting the pointer is reflected backwardly along its incoming path to a light detector. The time of detection can be utilized to determine the angle of the light beam with respect to a predetermined angle. However, this device requires a specially designed pointer which must be readily available. Another system utilizes a plurality of discrete detectors which provide identifiable output signals when the light beam is interrupted. By identifying the specific detector in line with the interrupted light beam, the angle of that beam with respect to a predetermined angle can be determined. However, the accuracy of these types of systems is limited by the number and resolution of the detectors being utilized. The present invention solves the above problems by utilizing a continuous optical sensor whereby the resolution of the system is only limited by the accuracy to which the time of beam interruption with respect to a reference time can be determined. Thus, no special pointer is required, only a pointer that is at least partially opaque to the beam light.

SUMMARY OF THE INVENTION

The invention provides a means for defining coordinates of an object intersecting a predefined plane. Included is a means for sweeping a first light beam and second light beam over a plane substantially coincident with the predefined plane. A light detection means is positioned so that it can be continuously irradiated by the first and second light beams as they are swept over the predefined plane. The light detection means provides a first intersection pulse when the first light beam intersects and is blocked by the object, and a second intersection pulse when the second light beam intersects and is blocked by the object. The invention also provides means for determining an angular relationship between a first reference angle and the first light beam at the time of the first intersection pulse and for determining an angular relationship between a second reference angle and the second light beam at the time of the second intersection pulse. These two angles can then be utilized to define the coordinates of the object intersecting the predefined plane.

In an exemplary embodiment, the predefined plane is chosen to be substantially coincident with a video monitor display surface. The coordinates of an object or pointer intersecting the predefined plane are provided in X-Y format, these coordinates then being supplied to the video monitor for generating a visually identifiable cursor on the video monitor display surface which identifies the location of the pointer with respect to the predefined plane. The exemplary embodiment utilizes lasers for generating the light beams, and includes first and second motors which rotate reflective surfaces to alternately sweep the first and second light beams across the predefined plane. The motors are chosen so that the reflective surfaces are rotated in opposite directions and do not simultaneously reflect their associated light beams across the predetermined plane. Zero timing pulses or signals from two reference detectors are provided, and pulses from the light detection means generated as a result of a blockage of the swept light beams by the pointer are utilized to define the angular relationship between the light beams at the times of intersection and the predetermined reference angles.

DETAILED DESCRIPTION

As required, a detailed illustrative embodiment of the invention disclosed herein exemplifies the invention and is currently considered to be the best embodiment for such purposes. It is provided by way of illustration and not limitation of the invention. Various modifications thereof will occur to those skilled in the art, and such modifications are within the scope of the claims which define the present invention.

As previously explained, the invention discloses a means for defining coordinates of an object or pointer intersecting a predefined plane which includes a first light beam swept over a plane substantially coincident with the predefined plane, and a second light beam which is also swept over a plane substantially coincident with the predefined plane. A continuous light detection means is provided around a portion of the periphery of the predefined plane so that each light beam while being swept over the predefined plane intersects the light detection means. When the pointer intersects the predefined plane, each light beam is interrupted during a portion of its travel, thereby providing an identifiable indication at the output of the light detection means. The invention provides a means for determining the angle formed by each light beam at the time of its interruption and a predetermined reference angle, so that the intersecting object can be angularly defined. The invention also provides a means for converting this angular definition to an X-Y coordinate system. In the exemplary embodiment described below, the coordinate defining means of the invention is utilized in conjunction with a video monitor, and the X-Y coordinates are utilized to generate a visually identifiable cursor on the video monitor corresponding to the point of intersection between the pointer and the plane. Thus, if the predefined plane is made to substantially coincide with the video display monitor, then the pointer intersecting the predefined plane and touching the display monitor will immediately cause a cursor to be generated and displayed at the area touched.

Figure 1:
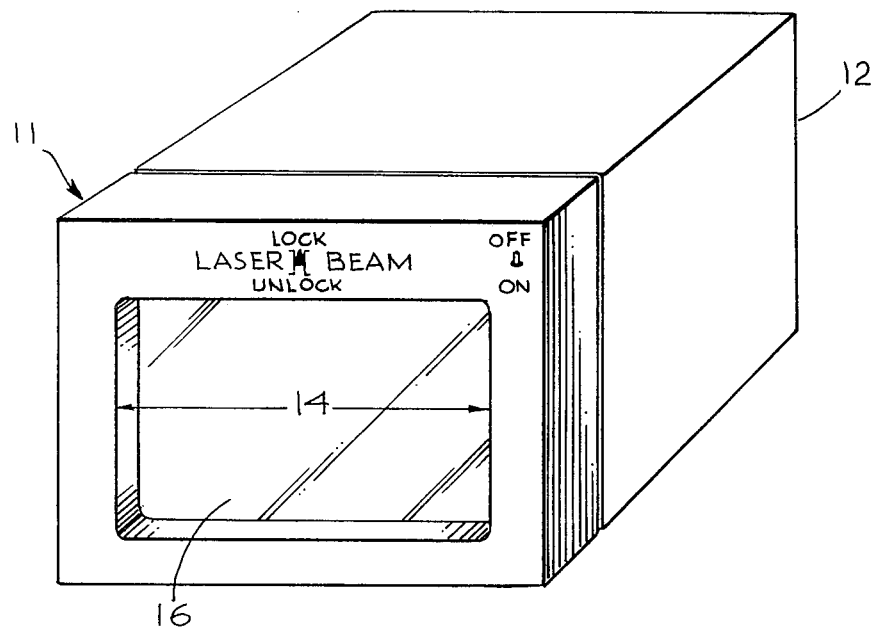
FIG. 1 is a perspective view showing the coordinate definition apparatus provided by the invention utilized in conjunction with a video monitor.
Figure 2:
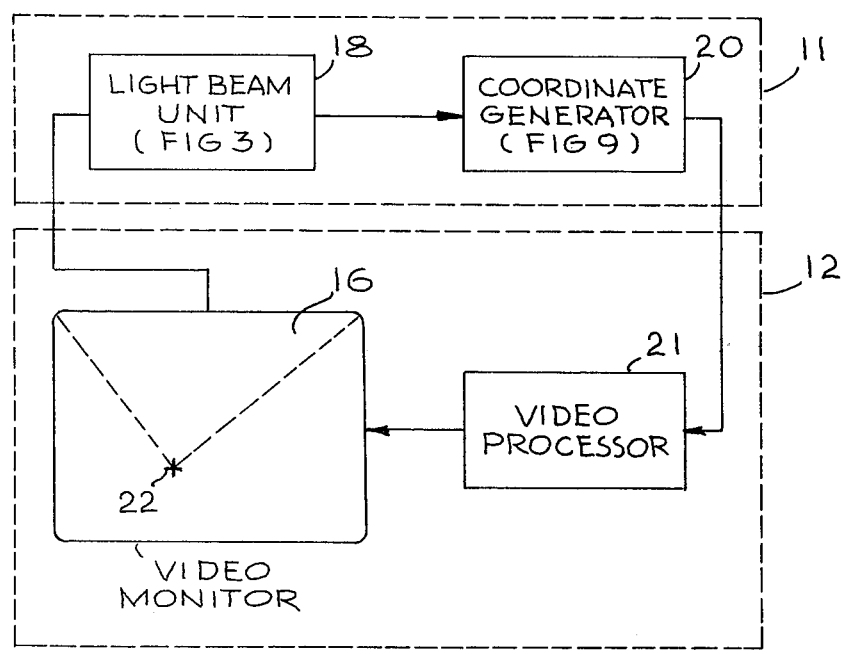
FIG. 2 is a block diagram of the apparatus shown in FIG. 1.

Referring now to FIG. 1, a coordinate definition apparatus 11 provided by the invention is positioned in front of a video monitoring unit 12 so that a rectangularly-shaped aperture or predefined plane 14 is positioned over the face of a display surface 16 which could be a cathode ray tube. The coordinate definition apparatus 11 provides a means for generating coordinate information of an object such as a pencil, pointer, finger or the like (not shown) at the location where it intersects the rectangularly-shaped aperture 14. Referring to FIG. 2, the coordinate definition apparatus 11 includes a light beam unit 18 and a coordinate generator 20. Coordinate information from the coordinate definition apparatus 11 provides coordinate information to a video processor 21 within the video monitoring unit 12. The video processor 21 then generates a cursor 22 on the display surface 16 which corresponds to the coordinate of the pointer intersecting the predefined plane 14. Thus, it can be appreciated that the invention provides a means whereby an operator merely by pointing to a location on the display surface can cause a cursor to be displayed at that location. The cursor may have the form of any arbitrary symbol such as an arrow, a cross, an X or the like.

Figure 3:
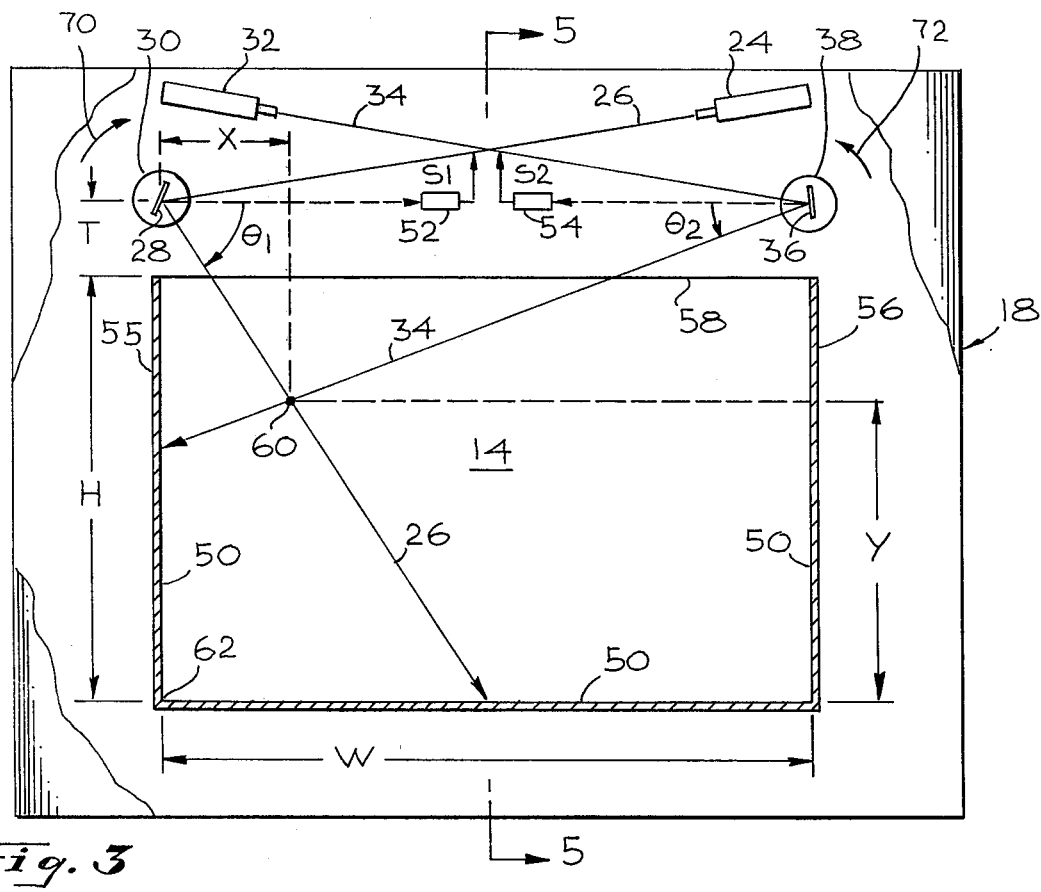
FIG. 3 is a partially cut away front view of the coordinate definition apparatus shown in FIG. 1 showing the various components and their geometric relationships with respect to each other and the predefined plane.

The light beam unit 18, shown in FIG. 3, includes a first laser 24. The first laser 24 generates a first laser beam 26 which is reflected by a first reflective surface 28 rotatably attached to a first motor 30. In a similar manner, a second laser 32 generates a second laser beam 34 which is reflected by a second reflective surface 36 rotatably attached to a second motor 38. Although lasers have been shown as the light beam generators, other types of light generators could be utilized so long as the beam width of the light beam does not become excessively large. It is preferable that the light beams 26 and 34 be formed of some type of collimated light. The reflective surfaces 28 and 36 could be mirrors or polished metallic surfaces.

Figure 4:
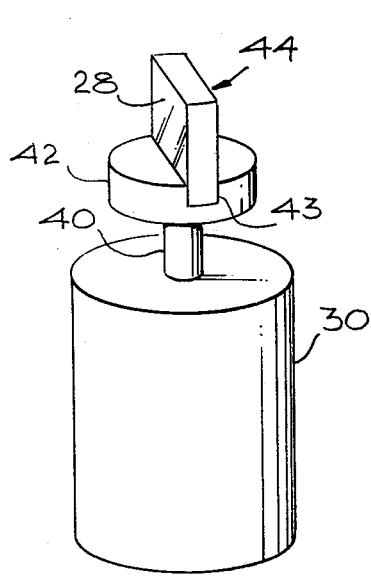
FIG. 4 is a perspective view showing one of the motors and its associated reflective surface.

The first motor 30 and its associated reflective surface 28 is shown in FIG. 4, the first and second motors 30 and 38 being identical except that one rotates in a clockwise direction and the other rotates in a counterclockwise direction as will be explained below. Referring to FIG. 4, the first motor 30 includes a shaft 40 which is connected to a disk 42 in which is formed a notch 43. A mirror 44 is positioned in and held by the notch 43, one side of the mirror 44 being the first reflective surface 28. The other side of the mirror 44 is non-reflective for reasons to be explained below.

Referring again to FIG. 3, a continuous optical sensor 50, which could be a plurality of interconnected solar cells, provides a DC output signal related to the intensity of light irradiating the sensor 50. A first reference sensor 52 provides a first timing signal or pulse S1 when irradiated by the first laser beam 26, this pulse S1 occurring at a time when the first laser beam 26 is being reflected in a predetermined direction. In a similar manner, a second reference sensor 54 provides a second timing signal or pulse 52 when the second laser beam 34 is reflected in a predetermined direction. In the exemplary body being described, the axes about which the reflective surfaces 28 and 36 rotate are positioned on a line colinear with the sides 55 and 56 of the rectangularly-shaped aperture 14. In addition, the axes of the motor shaft are placed equidistant from the top 58 of the rectangularly shaped aperture 14. A point 60 is shown as indicative of a location at which a pointer might extend into the predefined plane 14. Location of the point 60 can be determined if the angle $\theta 1$ between the first laser beam 26 when irradiating the first reference sensor 52 and the first laser beam when blocked by a pointer, and the angle $\theta 2$ between the second laser beam 34 when irradiating the second reference sensor 54 and the second laser beam when blocked by the pointer are known. Calculations of X-Y coordinates with respect to a lower point 62 of the predefined plane 14 from $\theta 1$ and $\theta 2$ is straightforward. Symbols utilized are W for the width of the plane, H for its height, and T for the distance above the top 58 of the plane at which the motors 30 and 38 axes lie. Utilizing the above symbols, the X and Y coordinates of point 60 are shown below.

$$X = \frac{W \cdot \text{TAN } \theta 2}{\text{TAN } \theta 1 + \text{TAN } \theta 2}$$
$$Y = (T + H) - (X \cdot \text{TAN } \theta 1)$$

Figure 5:
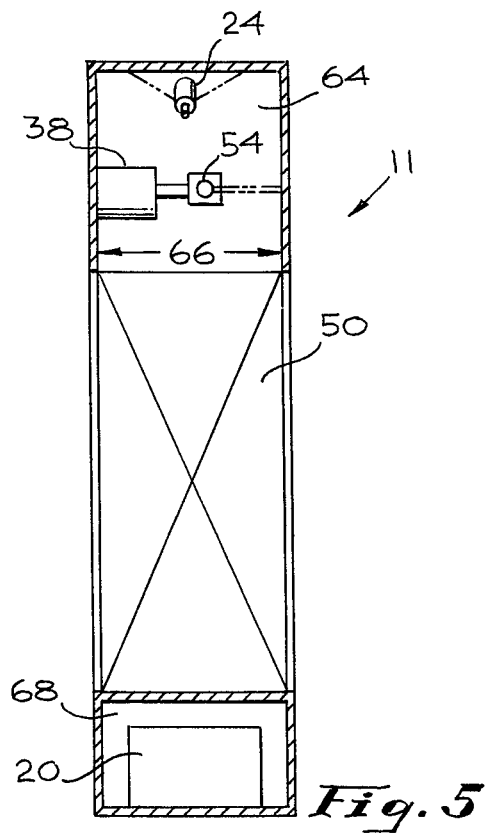
FIG. 5 is a cross-sectional view taken along lines 5—5 of FIG. 3.

FIG. 5 is a cross sectional view taken along line 5—5 of FIG. 3 showing the continuous optical sensor 50 and mounting of the second motor 38, the first laser 24 and the second reference sensor 54. The various elements used to generate the laser beams are mounted in an upper enclosure 64 formed by an upper portion of the coordinate definition apparatus 11. The upper enclosure 64 forms a U-shaped channel having an opening 66 through which the first and second laser beams 26 and 34 pass. As can be seen, a laser beam passing through the opening 66 must necessarily irradiate the continuous optical sensor 50. The coordinate generator 20 is located in the lower enclosure 68. Referring again to FIG. 3, and for reasons to be explained below, the first motor 30 rotates in a clockwise direction as shown by the arrow at 70, and the second motor 38 rotates in a counterclockwise direction as shown by the arrow at 72. The motors are controlled as will be explained below so that when the first reflective surface 28 is parallel to the left side 55 of the predefined plane 14 and facing the first reference sensor 52, the second reflective surface 36 will be parallel to the right side 56 of the predefined plane 14 but directed away from the second reference sensor 54. The second motor 38 is controlled so that it rotates at the same angular rate as the first motor 30, thus assuring that only one of the laser light beams 26 or 34 will be irradiating the continuous optical sensor 50 at any given time. However, as one skilled in the art can appreciate, the processing electronics could have been chosen to accommodate both laser beams irradiating the continuous optical sensor 50 at the same time. With the above described configuration, it can be appreciated that the two reference sensors 52 and 54 provide timing pulses S1 and S2 180 degrees out of phase with each other, and each pulse provides a zero degree reference time for its corresponding reflective surface. From the above description, it can be seen that as $\theta 1$ increases from zero to 90 degrees, the first laser beam 26 scans the optical sensor portion located on the left side 55 and the bottom of the rectangularly-shaped aperture 14. In a similar manner as $\theta 2$ increases from zero to 90 degrees, the second laser beam 34 scans the optical sensor portion mounted on the right side 56 and the bottom. As will be explained below, since the continuous optical sensor 50 responds to ambient light as well as the laser beams, there is a DC component of voltage generated by the sensors due to this ambient light.

Figure 6:
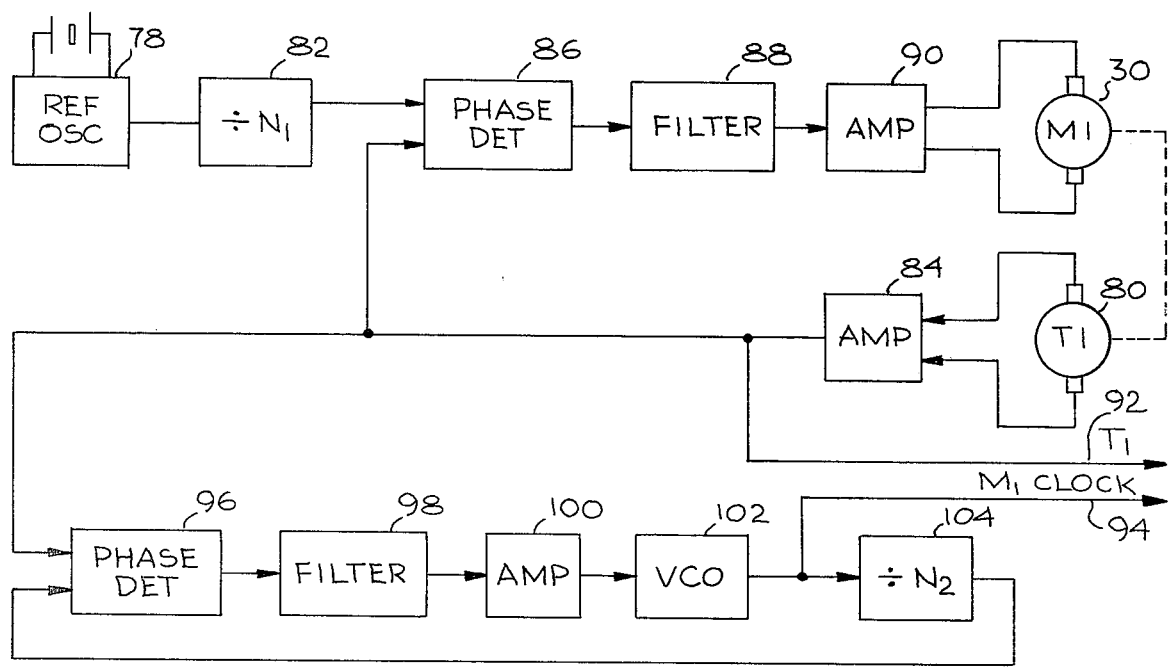
FIG. 6 is a block diagram showing the control system for the first motor and the generation of the first motor clock signal.

A control means will be described for controlling motor veocity so that the angle subtended by the light beam between its striking its associated reference sensor and the pointer can be accurately determined. The rotational velocities of the first and second motors 30 and 36, respectively, and the positioning of the two reflective surfaces 28 and 36 with respect to each other are controlled by a phase lock loop servo system. The servo system associated with the first motor 30 is shown in FIG. 6. A reference oscillator 78 provides a reference frequency to which the first motor 30 is to be controlled. A first tachometer 80 is also provided, the tachometer 80 providing a predetermined number of cyclical output signals for each 360 degree rotation of the motor shaft 40. A first divide circuit 82 is provided, its output frequency defining the rotational velocity of the motor 30 through the phase lock loop to be described below. The output of the first tachometer 80 is amplified by a first amplifier 84 and provided to a first phase detector 86. The output of the first phase detector 86 is related to the phase difference between the output frequency of the first tachometer 80 and the output frequency of the first divide network 82. A filter 88 and an amplifier 90, are provided, the output of the amplifier 90 being used to drive the first motor 30. This is a typical phase lock loop circuit and results in the motor being driven at a rotational or angular velocity such that the output of the first tachometer 80 is in phase with the output of the first divide circuit 82. The output signal of the first amplifier 84 is also provided as a T1 timing signal 92 which will be used in a manner to be explained below. Since a phase lock loop as above described can usually only control a motor velocity to about $\pm 0.5$ percent, it is desirable to generate a first motor clock signal 94 which is related to the actual angular velocity of the motor 30. This is accomplished by a second phase lock loop including a second phase detector 96, an associated filter 98 and an associated amplifier 100 which drives a first voltage controlled oscillator 102. The output of the voltage controlled oscillator 102 is divided by a second divide circuit 104, the output of which is provided as the other input to the second phase detector 96. Thus, the output of the phase detector 96, which is related to the phase difference between the output of the first tachometer 80 and the second divide network 104, alters the frequency of the first voltage controlled oscillator 102 until the two input signals to the second phase detector 96 are in phase. The output of the voltage controlled oscillator 102 thus comprises the first motor clock signal 94 which has a frequency precisely related to the angular velocity of the first motor 30.

Figure 7:
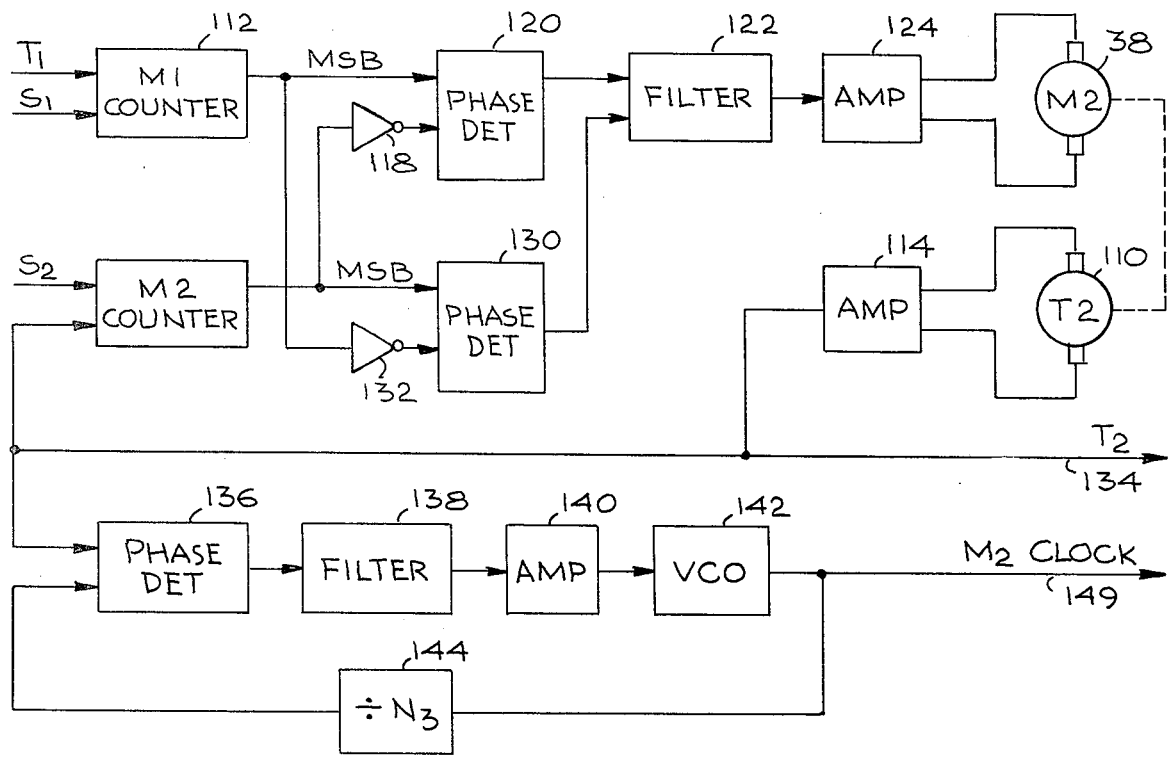
FIG. 7 is a block diagram showing the control system for the second motor and the generation of the second motor clock signal.

The second motor 38 is controlled to rotate at the same angular velocity but 180 degrees out of phase with the first motor 30 as previously explained. Referring to FIG. 7, the second motor 38 has an associated second tachometer 110 which provides the same number of cyclical output signals per motor revolution as the first tachometer 80. A first digital counter 112 is provided, the counter being reset by the timing signal S1 from the first reference sensor 52. The first counter 112 indexes once for each T1 timing signal from the first tachometer 80. The first tachometer 80 is chosen so that it has $2^n$ counts for each rotation of its associated motor 30. In this exemplary embodiment, n equals six, thus, the first tachometer 80 provides 64 output signals for each 360 degree motor rotation. The most significant bit or sixth bit, from the first digital counter 112 will thus be high when the first motor is rotating between 180 degrees and 360 degrees with respect to its zero degree reference. The second tachometer 110 also provides $2^n$ output signals for a 360 degree rotation of its associated motor 38, n being the same as for the first tachometer 80. These signals are amplified by an associated amplifier 114 and provided to a second digital counter 116. The second digital counter 116 is also reset by the second timing signal S2 generated by the second reference sensor 54. The most significant bit from the second digital counter 116 is also high when the second motor 38 is rotating between 180 and 360 degrees with respect to its zero reference. The most significant bit from the second digital counter 116 is inverted by a first inverter 118 and provided to a third phase detector 120. The output of the third phase detector 120 is filtered through a filter 122 and amplified by an associated amplifier 124. Thus, by inverting the most significant bit from the second digital counter 116, the third phase detector will provide an output signal related to the phase difference created as a result of the two motors 30 and 38 not being 180 degrees out of phase with repsect to each other. When the two motors are precisely 180 degrees out of phase with respect to each other, there will be no output signal from the third phase detector 120, thus indicating that the second motor 38 is rotating at the same angular velocity but 180 degrees out of phase with the first motor 30. The particular phase detector 120 chosen for this application only provides a phase correction on the leading edge of the most significant bit from the first digital counter 112. In order to effect adjustments more frequently, a fourth phase detector 130 is also provided, this phase detector receiving the most significant bit from the second digital counter 116 as one input, and the most significant bit from the first digital counter 112 after being inverted by a second inverter 132. The second tachometer 110 output signal 134 is designated as a T2 timing signal and is used for a purpose to be explained below. For similar reasons as explained in the FIG. 6 description, a fifth phase detector 136 is provided, this detector having as one input the output of the second tachometer 110. The fifth phase detector 136 output signal is provided to a filter 138 and an amplifier 140, the output of which controls a second voltage controlled oscillator 142. The output of the second voltage controlled oscillator 142 is provided to a third divide circuit 144, the output of which is then provided as the other input to the fifth phase detector 136. Thus, the output signal 148 from the second voltage controlled oscillator provides a second motor clock signal 149 whose frequency is directly related to the angular velocity of the second motor 38.

Figure 8:
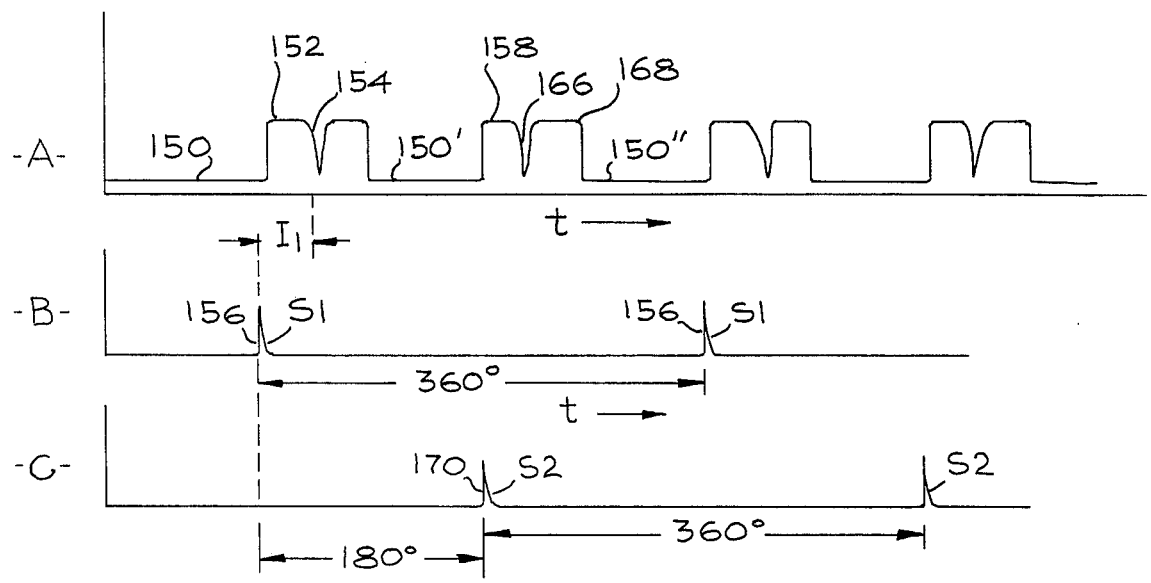
FIG. 8 shows various signal waveforms present in the block diagram of FIG. 7.

Referring now to FIGS. 3 and 8, the output of the continuous optical sensor 50 is shown in waveform A. The ambient light condition produces a constant low level output signal 150. As soon as the first laser beam 26 intersects the optical sensor 50, its output increases to a level shown at 152 until the laser beam 26 intersects an object or pointer positioned in the predefined plane 14. At this time a first downwardly extending intersection pulse 154 is created, the intersection pulse 154 indicating that the first laser beam 26 has been interrupted. Referring now to waveform B, the first timing signal S1 is shown at 156 is provided. Thus, the amount of angular rotation $\theta 1$ is related to the time interval defined by S1 and the intersection pulse 154 (shown as $I_1$) and the rotational velocity of the light beam during that time interval. As the first laser beam 26 is swept beyond the point 60, it eventually no longer irradiates the optical sensor 50 whose output then drops to that corresponding to the ambient light level as shown at 150'. The next output from the optical sensor 50 is shown at 158 and corresponds to the second laser beam 34 irradiating the optical sensor 50. When the second laser beam 34 intersects the pointer, a second downwardly extending intersection pulse 166 is generated. As the second laser beam continues to sweep across the predefined plane 14, the output of the optical sensor 50 returns to a value shown at 168 until it is no longer irradiated by the laser light beam as shown at 150''. The time interval between the output of the second reference sensor 54 as shown in waveform C at 170, and the second intersection pulse 166 is related to the second angle $\theta 2$.

Figure 10:
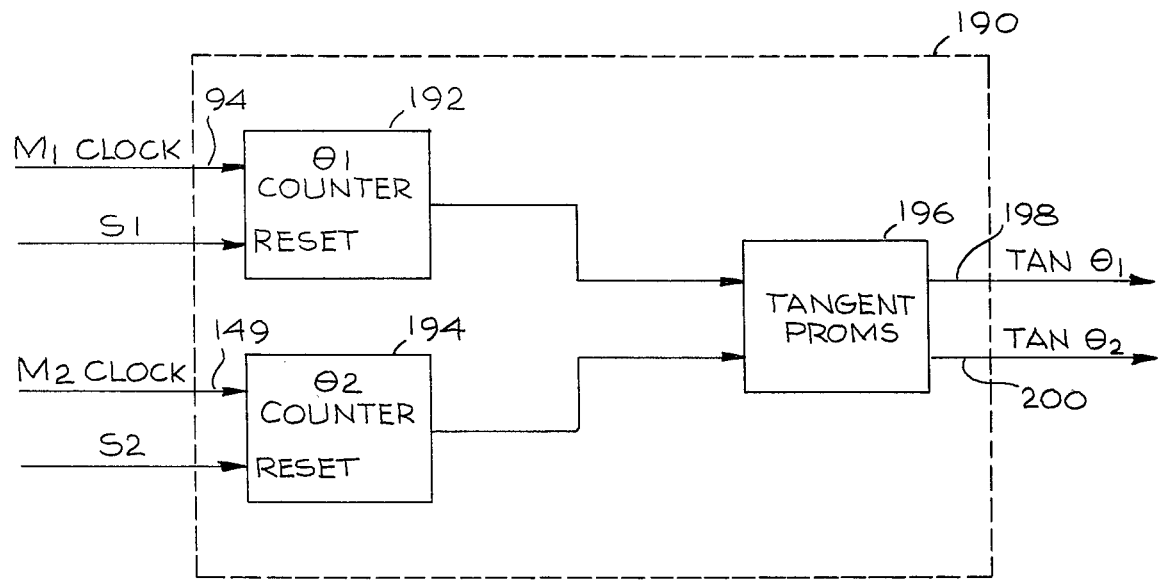
FIG. 10 is a block diagram showing generation of the tangent $\theta 1$ and tangent $\theta 2$ signals.
Figure 9:
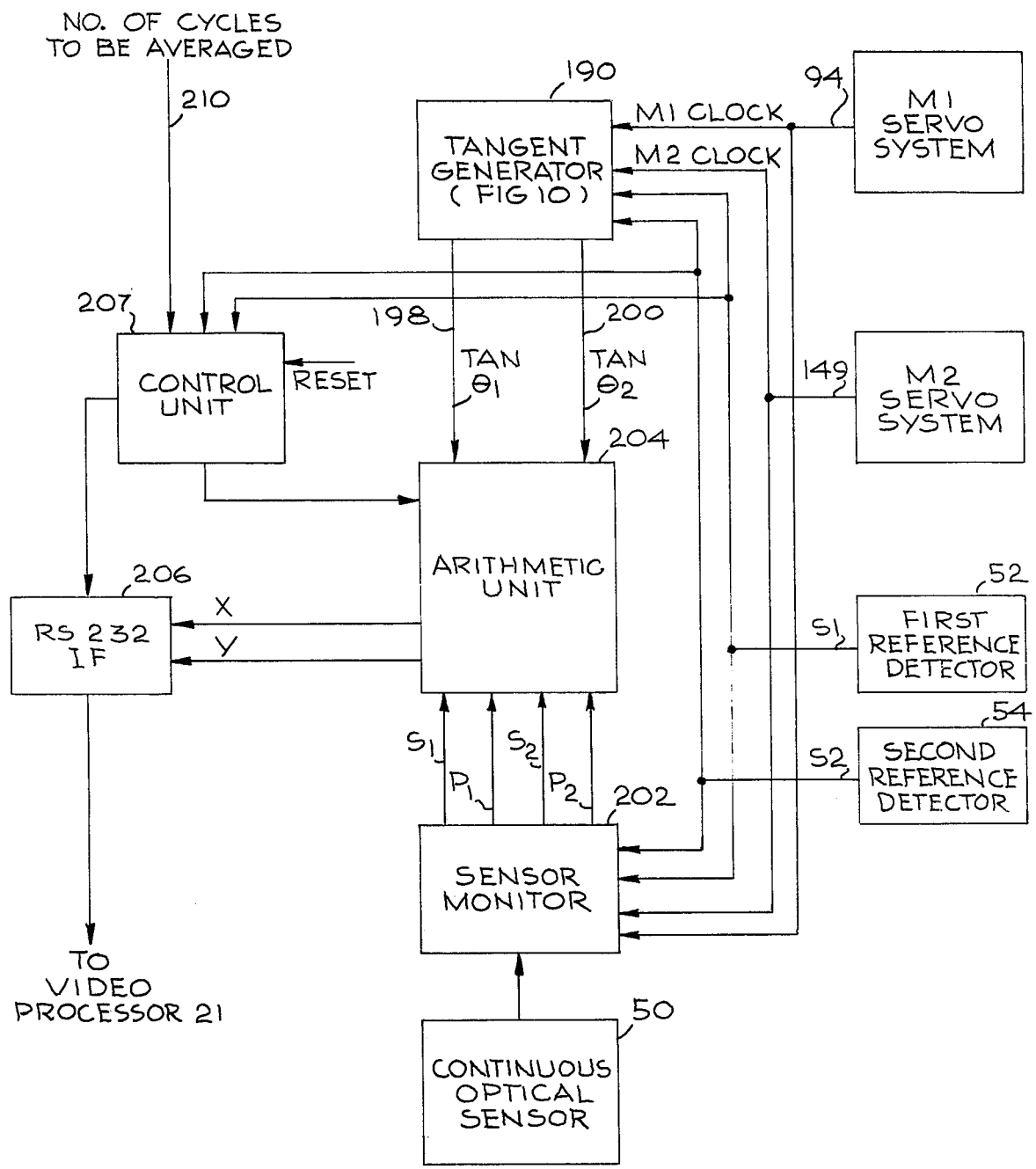
FIG. 9 is a block diagram showing generation of X and Y coordinates within the predefined plane.

The coordinate generator 20 is shown in FIG. 9 and is configured to calculate X and Y coordinates based upon the angles $\theta 1$ and $\theta 2$, and the rotational velocities of the first and second motors 30 and 38, respectively. The first motor clock signal 94 and the second motor clock signal 149 are provided to a tangent generator 190. Also, provided to the tangent generator are the first timing signals S1 from the first reference sensor 52 and the second timing signal S2 from the second reference sensor 54. The tangent generator 190 is shown in further detail in FIG. 10. Referring to FIG. 10, a $\theta 1$ counter 192 and a $\theta 2$ counter 194 are provided. The counter 192 is reset by the first timing signal S1, and then is incremented by each of the first motor clock signals 94. The output of the $\theta 1$ counter 192 addresses tangent PROMS 196, which in turn provide an output signal 198 which corresponds to the tangent of $\theta 1$ at each of the first motor clock signals 94. The tangent PROMS 196 are programmed so that each address location has a tangent value stored which corresponds to the angular position of the light beam when each clock signal is generated. Each clock signal, as it indexes the $\theta 1$ counter 192, thus causes a corresponding memory location in the tangent PROMS to be addressed. In this manner, the accuracy of the tangent $\theta 1$ signal on 198 is related only to the angular position of the laser beam, and not to its angular velocity. In a similar manner, the $\theta 2$ counter 194, which is reset by the second timing signals S2 continually increments the tangent PROMS 196 for each of the second motor clock signals 149. Thus, the output of the tangent PROMS 196 on line 200 corresponds to the tangent of $\theta 2$ at the time of each of the second motor clock signals 149.

Referring again to FIG. 9, the output of the continuous optical sensor 50 is provided to a sensor monitor 202 which solves the $\theta 1$, $\theta 2$ to X-Y coordinate equations previously provided. The sensor monitor 202 is chosen so that when it receives a first timing signal S1 from the first reference detector 52, it begins looking for a first intersection pulse 154 as shown in FIG. 8. When a first intersection pulse 154 occurs, it causes the sensor monitor 202 to provide a first identification pulse P1 to the arithmetic unit. The sensor monitor 202 is chosen so that if the first intersection pulse does not occur before 90 degrees rotation of the first reflective surface has occurred, it will not provide an identification pulse P1 output until another timing signal S1 is received. The 90 degrees angular rotation is determined by counting the clock pulses 94, a predetermined number of which correspond to 90 degrees of rotation as previously explained. In a similar manner when the sensor monitor 202 receives second timing signal S2 from the second reference sensor 54, it begins looking for a second intersection pulse P2 corresponding to 166 in waveform A of FIG. 8. Thus, the number of clock signals 94 that occur in this time interval I1 defined by S1 and the first identification pulse P1 identify the time at which the output on 198 corresponds to the tangent of $\theta 1$ at the time the laser beam intersects the pointer. The tangent of $\theta 2$ is determined in a similar manner. The arithmetic unit 204 can then calculate X-Y coordinates of the point 60 shown in FIG. 3 and provide that to an IF generation circuit 206 which in turn drives the video processor 21 shown in FIG. 2. If it is desired to obtain average values of $\theta 1$ and $\theta 2$ prior to generating a cursor on the video monitor, the arithmetic unit can be provided with $\theta 1$ and $\theta 2$ summation registers, (not shown) the outputs of which can be utilized to provide average $\theta 1$ and $\theta 2$ values for a predetermined number of laser beam sweep cycles. A control unit 207 is provided to control the arithmetic unit 204 in accordance with the first and second timing signals S1 and S2. Another input 210 to the control unit 207 is the number of laser beam sweep cycles to be effected before average values of tangent $\theta 1$ and $\theta 2$ are determined prior to an X-Y coordinate calculation. The control unit 207 is configured to control the arithmetic unit 204 in accordance with the sequence shown below.

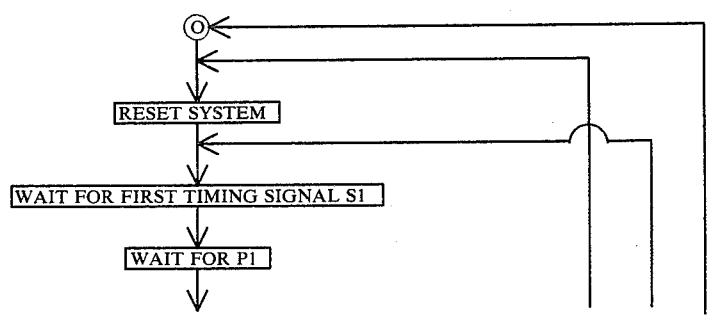

-continued
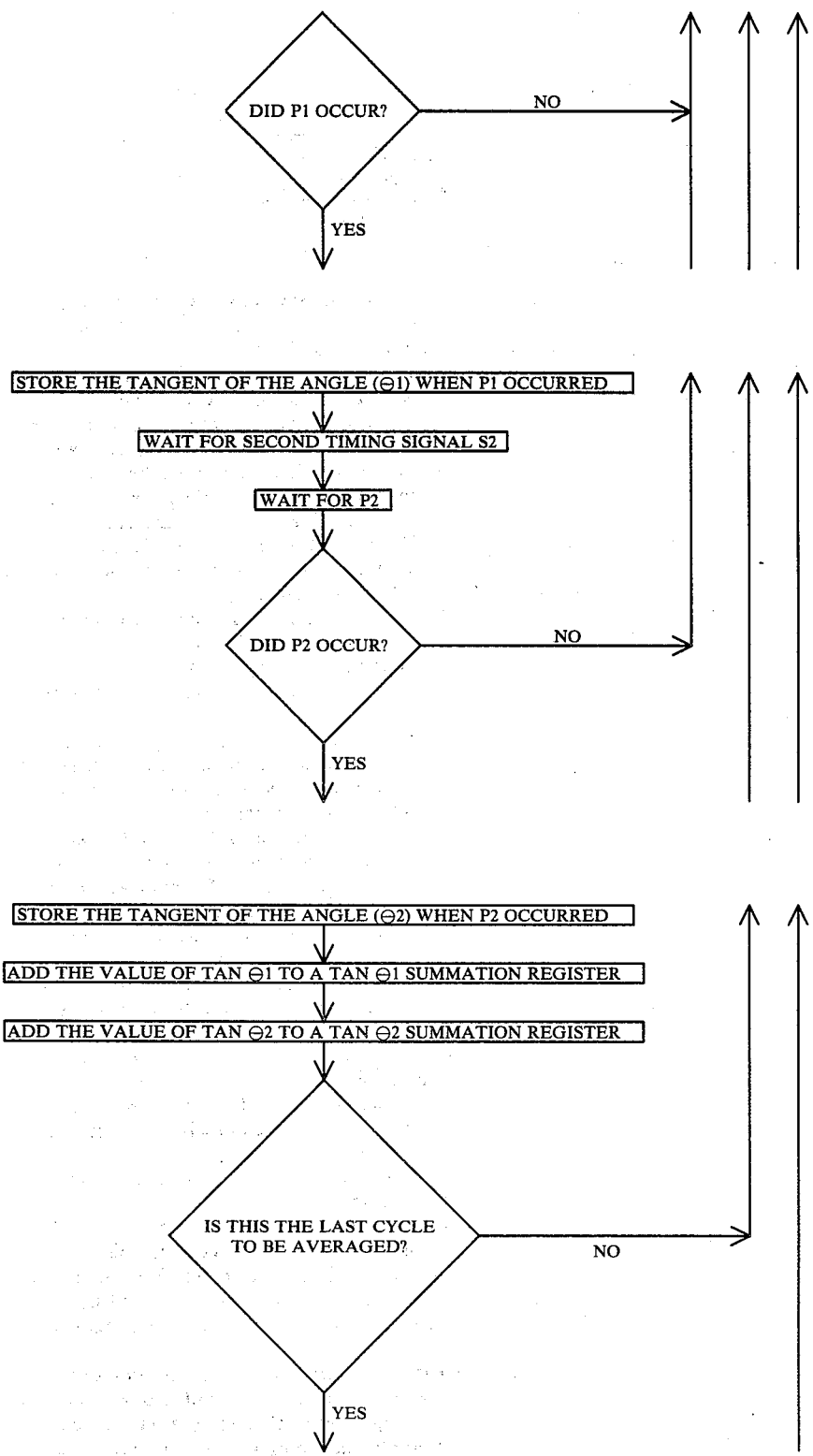

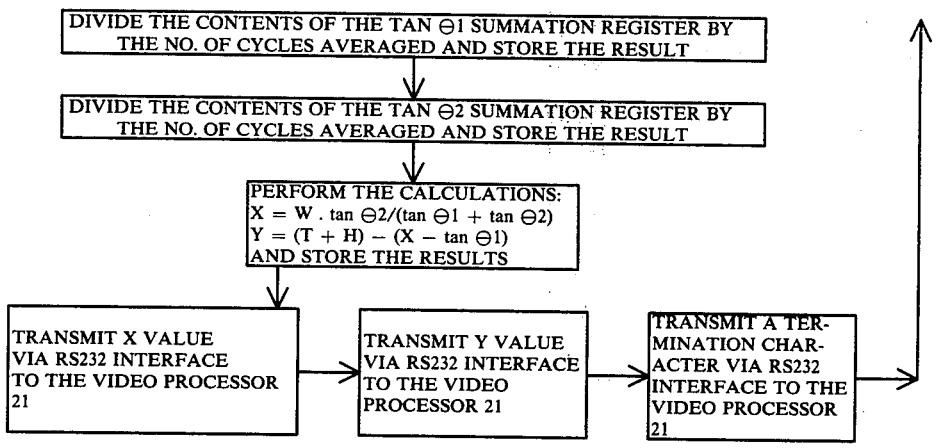

As one can appreciate, many different ways of contolling the arithmetic unit 204 could be implemented, and the sequence provided above is shown as merely an example of one way in which X-Y coordinates could be generated. A microprocessor could also be configured to implement the above sequence.

Thus, from the above description it should now be apparent that a coordination definition apparatus has been provided utilizing a continuous optical sensor and two laser beams which are swept across a predefined plane. When a pointer or object is inserted through the plane, the coordinates of that object are developed by defining the angle at which the two laser beams make with respect to predetermined reference angles when they intersect the pointer. Thus, the optical sensor itself need not provide any spatial resolution, and need only indicate times that laser beam/pointer intersections occur.

What is claimed is:

1. A means for defining coordinates of an object intersecting a predefined plane, comprising:
   a first rotatable means for sweeping a first light beam over a plane substantially coincident with said predefined plane;
   a second rotatable means for sweeping a second light beam over a plane substantially coincident with said predefined plane;
   an elongated light detection means positioned to be continuously irradiated by said first and second light beams while being swept over said predefined plane, said light detection means providing a first intersection pulse when said first light beam intersects and is blocked by said object and a second intersection pulse when said second light beam intersects and is blocked by said object;
   first timing means for generating a first timing signal when said first light beam is at a first predetermined reference angle;
   second timing means for generating a second timing signal when said second light beam is at a second predetermined reference angle;
   processor means responsive to the time duration between said first timing signal and said first intersection pulse and between said second timing signal and said second intersection pulse for producing X-Y coordinate signals defining the coordinates of said object;
   said first rotatable means including a first motor;
   a first tachometer providing an output signal indicative of the rotational velocity of said first motor;
   a reference oscillator;
   means for controlling said first motor rotational velocity in accordance with a phase difference between said first tachometer output signal and a signal produced by said reference ocillator;
   a first voltage controlled ocillator; and
   means for controling the frequency of said first voltage controlled ocillator in accordance with a phase difference between a signal related to the output of said first voltage controlled ocillator and said first tachometer output signal.

2. The means of claim 1 wherein said second rotatable means includes a second motor;
   a second tachometer providing an output signal indicative of the rotational velocity of said second motor;
   means for controling said second motor rotational velocity in accordance with a phase difference between said second tachometer output signal and said first tachometer output signal;
   a second voltage controlled ocillator; and
   means for controlling the frequency of said second voltage controlled ocillator in accordance with a phase difference between a signal produced by said second voltage controlled ocillator and said second tachometer output signal.

3. The means of claim 2 wherein said means for contolling said second motor rotational velocity comprises separation means for causing said second timing signals to be phase offset 180 degrees with respect to said first timing signals.

4. The means of claim 3 wherein said second rotatable means rotates counterclockwise with respect to said first rotatable means.

5. The means of claim 3 wherein said separation means comprises:
   means for creating a first transition signal having a first state when said first rotatable means rotates through a first 180 degrees after the occurrence of said first timing signal and a second state when said first rotatable means rotates through a second 180 degrees;
   means for creating a second transition signal having a first state when said second rotatable means rotates through a first 180 degrees after the occurrence of said second timing signal and a second state when said second rotatable means rotates through a second 180 degrees; and means for driving said second motor so that said first transition signal is 180 degrees out of phase with said second transition signal.

6. The means of claim 5 wherein said first and second tachometers provides $2^n$ output signals per revolution said means for creating a first transistion signal comprises a first digital counter for counting said first tachometer output signals, the $n^{th}$ output bit of which comprises said first transition signal, and a means for resetting said first digital counter by said first timing signal, said means for creating a second transition signal comprises a second digital counter for counting said second tachometer output signals, the $n^{th}$ output bit of which comprises said second transistion signal, and a means for resetting said second digital counter by said second timing signal, and said means for driving comprises:

means for inverting one of said transition signals with respect to the other transition signal;

means for determining a phase difference between said inverted transition signal and the other transition signal; and means for controlling said second motor until the phase difference between said inverted and non-inverted transition signals is zero.

7. The means of claim 1 wherein said predefined plane is substantially rectangular in shape having an upper, left and right side, said first rotatable means rotating about an axis orthogonal to a line extending upwardly and coincident with said left side, said second rotatable means rotating about an axis orthogonal to a line extending upwardly and coincident with said right side, and said axes being equally spaced from said upper side.

8. The means of claim 1 further comprising means for utilizing said X-Y coordinate signals to generate a visually identifiable cursor on a video monitor screen.

9. A method for generating a visually identifiable mark on a video monitor screen corresponding to a point on said screen indicated by an object intersecting a predefined plane substantially coincident with said screen, comprising the steps of:

alternately sweeping first and second light beams over a plane coincident with said predefined plane;

locating an elongated continuous light detection means so that it is irradiated by said fist and second light beams as they are swept across said predefined plane;

detecting a first intersection pulse from said light detection means when said first light beam intersects and is blocked by said object;

detecting a second intersection pulse from said light detection means when said second light beam intersects and is blocked by said object;

determining from said first and second intersection pulses the coordinates of said intersecting object with respect to said predefined plane; and producing said visually identifiable mark on said video monitor screen at the determined coordinates.

10. Apparatus for producing information signals representing the coordinates of an opaque object intersecting a particular area of a predefined plane, said apparatus comprising:

an elongated continuous optical sensor mounted coincident with a portion of the periphery of said particular area and characterized by producing an electrical output signal indicative of the level of light irradiating said sensor along the length thereof;

first source means for cyclically sweeping a first light beam across said particular area substantially coincident with the plane thereof to irradiate said sensor along successive increments of its length, said sensor output signal exhibiting a first intersection pulse when said first beam intersects said opaque object;

second source means for cyclically sweeping a second light beam across said particular area substantially coincident with the plane thereof to irradiate said sensor along successive increments of its length, said sensor output signal exhibiting a second intersection pulse when said second beam intersects said opaque object;

control means for alternately defining first and second intervals, said control means coupled to said first and second source means for causing said first source means to irradiate said sensor only during said first intervals and said second source means to irradiate said sensor only during said second intervals; and processor means responsive to said sensor output signal first and second intersection pulses for producing said information signals representing the coordinates of said opaque object.

11. The apparatus of claim 10 wherein said processor means includes means for determining the angular relationship between said first beam and a first reference line at the time of occurrence of said first intersection pulse and for determining the angular relationship between said second beam and a second reference line at the time of occurrence of said second intersection pulse.

12. The apparatus of claim 10 wherein each of said first and second source means includes a rotatably mounted element for directing a light beam across said particular area; and wherein said control means includes first servo means for maintaining constant the rotational velocity of said first source means rotatable element and second servo means for maintaining constant the rotational velocity of said second source means rotatable element.

13. The apparatus of claim 12 wherein said control means further includes means for maintaining said first and second source means rotatable elements 180 degrees out of phase.

14. The apparatus of claim 13 including means for generating a first timing signal when said first source means rotatable element is at a precise position in its cycle and for generating a second timing signal when said second source means rotatable element is at a precise position in its cycle.

15. The apparatus of claim 14 wherein said processor means includes means responsive to the time interval between occurrence of said first timing signal and said first intersection pulse and the time interval between occurrence of said second timing signal and said second intersection pulse.

* * * * *